United States Patent Office 3,804,878
Patented Apr. 16, 1974

3,804,878
HYDROGENATED ARALIPHATIC ACIDS
William Laszlo Bencze, Therwil, Switzerland, assignor to Ciba-Geigy Corporation, Ardsley, N.Y.
No Drawing. Continuation-in-part of abandoned application Ser. No. 856,141, Sept. 8, 1969, which is a continuation-in-part of application Ser. No. 806,694, Mar. 12, 1969, now Patent No. 3,709,994, which is a continuation-in-part of abandoned application, Ser. No. 789,078, Jan. 2, 1969, which in turn is a continuation-in-part of abandoned application Ser. No. 714,780, Mar. 21, 1968. This application Apr. 17, 1972, Ser. No. 244,911
Int. Cl. C07c 63/44, 69/76
U.S. Cl. 260—468.5
7 Claims

ABSTRACT OF THE DISCLOSURE

Hydrogenated tricyclic α-aryl-aliphatic acids, e.g. those of the formula

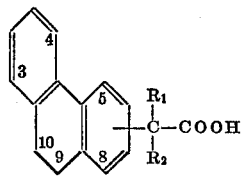

$R_1$=H or alkyl
$R_2$=H, alk(en)yl, cycloalk(en)yl or cycloalk(en)yl-alkyl the dihydro, tetrahydro, hexahydro and functional acid derivatives thereof, are anti-inflammatory agents.

CROSS-REFERENCES TO RELATED APPLICATIONS

This is a continuation-in-part of application Ser. No. 856,141, filed Sept. 8, 1969, now abandoned, which in turn is a continuation-in-part of application Ser. No. 806,694, filed Mar. 12, 1969, now Pat. No. 3,709,994, which in turn is a continuation-in-part of application Ser. No. 789,078, filed Jan. 2, 1969, now abandoned, which in turn is a continuation-in-part of application Ser. No. 714,780, filed Mar. 21, 1968, now abandoned.

SUMMARY OF THE INVENTION

The present invention concerns and has for its object the provision of new hydrogenated tricyclic α-aryl-aliphatic acids of the Formula I

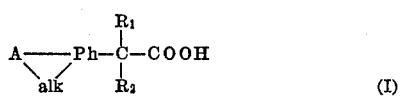

in which A is a 1,2-phenylene, 1,2-cyclohexadienylene, 1,2-cyclohexenylene or 1,2-cyclohexylene radical, alk is lower alkylene separating A from the Ph-nucleus by 1 or 2 carbon atoms, Ph is a 1,2-phenylene radical carrying the acidic moiety in one of the remaining positions, $R_1$ is hydrogen or lower alkyl and $R_2$ is hydrogen, lower alkyl, alkenyl, cycloalkyl, cycloalkenyl, cycloalkylalkyl or cycloalkenyl-alkyl, of the therapeutically acceptable functional acid derivatives thereof, as well as of corresponding pharmaceutical compositions and of methods for the preparation and application of these products. Said compositions are useful anti-inflammatory agents in the treatment or management of arthritic and dermatopathologic conditions.

DESCRIPTION OF THE PREFERRED EMBODIMENT

The 1,2-phenylene radicals A and Ph are unsubstituted or substituted in the remaining 3 or 4 positions respectively, by one or more than one, preferably one or two, of the same or different substituents selected, for example, from lower alkyl, e.g. methyl, ethyl, n- or i-propyl or -butyl, free etherified or esterified hydroxy or mercapto, such as lower alkoxy or alkylmercapto, e.g. methoxy, ethoxy, n- or i-propoxy or -butoxy, methylmercapto or ethylmercapto, or halogeno, e.g. fluoro, chloro or bromo; trifluoromethyl, nitro or amino, preferably lower alkanoylamino, di-lower alkylamino or lower alkyleneimino, e.g. acetylamino, dimethylamino or diethylamino, ethylene imino, pyrrolidino or piperidino, cyano, carbamoyl, di-lower alkyl-carbamoyl, carboxy, lower alkylsulfonyl, sulfo, sulfamoyl or di-lower alkyl-sulfamoyl, e.g. N,N-dimethyl-carbamoyl or -sulfamoyl, methyl- or ethylsulfonyl. The term "lower", referred to above and hereinafter in connection with organic radicals or compounds respectively, defines such with up to 7, preferably up to 4, carbon atoms.

More particularly, the phenylene radicals A and Ph each represent 1,2-phenylene, (lower alkyl)-1,2-phenylene, (lower alkoxy)-1,2-phenylene, (halogeno)-1,2-phenylene, (trifluoromethyl)-1,2-phenylene or (di-lower alkylamino)-1,2-phenylene, whereby Ph additionally carries the acidic moiety, preferably in the 4- or 5-position thereof.

The 1,2-cyclohexylene radical A, containing up to 2 double bonds, is unsubstituted or substituted as shown for the corresponding 1,2-phenylene radical. More particularly, it represents 1,2-cyclohexylene, 1,2-cyclohexenylene, 1,2-cyclohexadienylene or one of these radicals containing up to 2 lower alkyl groups in any of the 6 positions available for substitution.

Above all, it represents 1,2-cyclohexylene, (lower alkyl)-1,2-cyclohexylene, 1,2-cyclohexenylene or (lower alkyl)-1,2-cyclohexenylene.

The lower alkylene moiety alk above all represents 1,2-ethylene, but also stands for methylene, 1,1-ethylene, 1,1- or 1,2-propylene, 1,1-, 1,2-, 2,2- or 2,3-butylene, 1,1-, 1,2-, 2,3- or 3,3-pentylene, 3,3- or 3,4-hexylene, 1,1- or 1,2-heptylene.

The lower alkyl radicals $R_1$ and/or $R_2$ represent, for example, methyl, ethyl, n- or i-propyl, -butyl, -pentyl, -hexyl or -heptyl. A lower alkenyl radical $R_2$ is, for example, vinyl, allyl, methallyl, 3-butenyl or 1-pentenyl. A cycloalkyl or cycloalkenyl radical $R_2$ is preferably 3 to 7 ring-membered and unsubstituted or substituted by up to 4 lower alkyls, such as cyclopropyl, 1- or 2-methylcyclopropyl, 1,2-, 2,2- or 2,3-dimethyl-cyclopropyl, 1,2,2- or 1,2,3-trimethyl-cyclopropyl or 2,2,3,3-tetramethyl-cyclopropyl, cyclobutyl, 3,3-dimethyl-cyclobutyl or 2,2,3-trimethyl-cyclobutyl, cyclopentyl, 2- or 3-methyl-cyclopentyl, 2,5- or 3,4-dimethyl-cyclopentyl, cyclohexyl, 2-3- or 4-methyl-cyclohexyl, 2,3-, 2,4- or 3,5-dimethyl-cyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1 or 2-cyclohexenyl. A cycloalkyl-lower alkyl or cycloalkenyl-lower alkyl radical $R_2$ is one of the above-mentioned lower alkyl groups, preferably such with up to 4 carbon atoms, having in any position thereof, preferably at the terminal carbon atom, one of said cycloalkyl or cycloalkenyl radicals attached, e.g. cyclopropylmethyl, 2-cyclopentylethyl or 3-cyclopentenylmethyl.

Therapeutically acceptable functional derivatives of the acids of Formula I are preferably their esters, for example, their lower alkyl, lower alkenyl, 3 to 7 ring-membered cycloalkyl, cycloalkenyl, cycloalkyl-lower alkyl or cycloalkenyl-lower alkyl, aryl or aralkyl esters, e.g. the H₂Ph- or H₂Ph-lower alkyl esters, free or etherified hydroxy-lower alkyl esters, e.g. lower alkoxy- or 3 to 7 ring-membered cycloalkoxy-lower alkyl esters or tert. amino-lower alkyl esters, of which the esterifying moiety has been exemplified above and, if it contains hetero atoms, these are separated from the carboxy oxygen by at least 2 carbon atoms, preferably by 2 or 3 carbon atoms. A tertiary amino group therein is above all di-lower alkylamino, e.g. dimethylamino or diethylamino lower alkyleneimino, e.g. pyrrolidino or piperidino, or mono-azaoxa, or thia-lower alkyleneimino, such as piperazino, 4-lower alkyl-piperazino, e.g. 4-methyl- or 4-ethyl-piperazino, morpholino or thiamorpholino. Other functional derivatives of the acids of Formula I are, for example, unsubstituted or substituted amides or thioamides, e.g. mono- or di-lower alkylamides, H₂Ph-amides, H₂Ph-lower alkylamides, monocyclic lower alkylene amides, monoaza-, monooxa- or monothia-lower alkyleneamides, furthermore the corresponding thioamides, hydroxamic acids, nitriles, ammonium or metal salts. Functional derivatives are also those of amino compounds, such as lower alkyl- or H₂Ph-lower alkyl quaternaries and acid addition salts.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al., Proc. Soc. Exp. Biol. & Med. 111, 544 (1962). According to it, the compounds of the invention are applied, in the form of aqueous solutions or suspensions, which may contain carboxymethylcellulose or polyethylene glycol as solubilizers, by stomach tube to male and female mature rats, in the dosage range between about 0.1 and 75 mg./kg./day, preferably between about 0.5 and 50 mg./kg./day, advantageously between about 1 and 25 mg./kg./day. About 1 hour later 0.06 ml. of a 1% aqueous saline suspension of carrageenin is injected into the rat's left hind paw and 3–4 hours subsequently any anti-inflammatory activity can be expressed by the difference of the volume and/or weight of the edematous left paw and that of the right paw, as compared with said difference estimated from untreated control animals. In view of the test results obtained, the compounds of the invention are useful anti-inflammatory agents in the treatment or management of arthritic and dermatopathologic conditions. They are also useful as intermediates in the preparation of other valuable products, preferably of pharmacologically active compounds.

Particularly useful are the compounds of Formula I, in which each of A and Ph is 1,2-phenylene, (lower alkyl)-1,2-phenylene, (lower alkoxy)-1,2-phenylene, (halogeno)-1,2-phenylene, (trifluoromethyl) - 1,2 - phenylene or (di-lower alkylamino)-1,2-phenylene, of which Ph contains the acidic moiety in the 3-, 4- or 5-positions, A also is 1,2-cyclohexylene, (lower alkyl)-1,2-cyclohexylene, 1,2-cyclohexenylene or (lower alkyl)-cyclohexenylene, alk is 1,2-ethylene, R₁ is hydrogen and R₂ is hydrogen, lower alkyl or 3- to 7-ring-membered cycloalkyl, or a lower alkyl ester, the ammonium, or an alkali or alkaline earth metal salt thereof.

Preferred compounds of the invention are those of Formula II

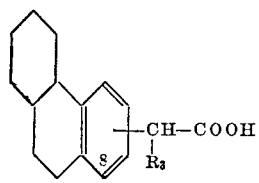

(II)

in which the acidic moiety is in one of the 6-, 7- or 8-positions and R₃ is hydrogen or lower alkyl, the 4a,10a-dehydro derivative thereof, or a lower alkyl ester, the ammonium or an alkali metal salt thereof.

Especially valuable are compounds of the Formula II, in which R₃ is hydrogen or methyl, preferably its 4a,10a-cis-isomer thereof, the 4a,10a-dehydro derivative thereof, or a lower alkyl ester, the ammonium, sodium or potassium salt thereof.

The compounds of this invention are prepared according to methods known per se. For example, they are obtained by converting in a compound of the Formula III

(III)

in which $X_1$ is a substituent capable of being converted into the free or functionally converted

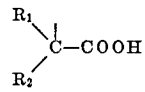

moiety, $X_1$ into said moiety and, if desired, converting any resulting compound into another compound of the invention.

According to the above process the compounds of the invention are prepared either by (α) introduction of the whole free or functionally converted acid moiety

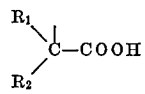

or any part thereof (preferably the carboxylic function), into compounds of Formula III, or by (β) liberation of said acid moiety from a suitable group containing already the required number of carbon atoms, i.e. the liberation of a potential carboxy or alkylidene moiety.

Accordingly, the simplest substituent $X_1$ is a hydrogen atom, a metallic group or a reactively esterified hydroxy group. The former is, for example, an alkali metal, e.g. a lithium atom, or a substituted alkaline earth metal, zinc or cadmium atom, such as halomagnesium or lower alkyl zinc or cadmium, e.g. chloro-, bromo- or iodomagnesium, methyl or ethyl zinc or cadmium. A reactively esterified hydroxy group is preferably such derived from a strong mineral or sulfonic acid, such as a hydrohalic, sulfuric, lower alkane or benzene sulfonic acid, e.g. hydrochloric, hydrobromic-, methane-, ethane-, benzene- or p-toluene-sulfonic acid. The corresponding starting material of Formula III is reacted with the acid having the formula

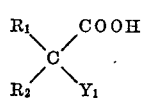

or a suitable derivative, e.g. a corresponding salt, ester, amide or nitrile thereof, in which formulae one of $X_1$ and $Y_1$ is the above-described metallic group and the other said reactively esterified hydroxy group, or $X_1$ is hydrogen and $Y_1$ is a free or reactively esterified hydroxy group. Such reaction is performed according to the classical Grignard or Friedel-Crafts syntheses, in which a new carbon-carbon bond is formed from separate reactants. The latter syntheses is performed in the presence of a Lewis acid, such as an aluminum, boron, antimony V, ferric or zinc salt, e.g. the chlorides thereof, or hydrofluoric, sulfuric or preferably polyphosphoric acid, which latter agent is advantageously used with the above glycolic acids or their derivatives, i.e. those in which $Y_1$ is hydroxy. In case $X_1$ is a hydrogen atom and Ph contains a free or functionally converted γ-carboxy-2-alkenyloxy group in the ortho or para position thereto, such allyl ether starting material, e.g. that of the formula

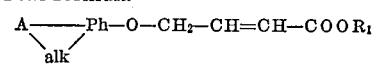

can be rearranged according to the Claisen (Cope) rearrangement procedure, for example, by heating it up to about 300° or less, to yield compounds of Formula I in which $R_2$ is lower alkenyl and Ph contains a hydroxy group ortho or para to the acid moiety, or functional acid derivatives, e.g. esters or lactones, thereof.

The substituent $X_1$ in Formula III is also the group

in which $Y_2$ is a metallic group, e.g. such mentioned above, an ammonium group, such as tri-lower alkylammonium or dilower alkyl-aralkylammonium, e.g. trimethylammonium or dimethylbenzylammonium, or a free or reactively converted, such as esterified, etherified or salified, hydroxy group, e.g. such esterified as mentioned above, or etherified with a lower alkanol or aralkanol, or salified with an alkali or alkaline earth metal, e.g. sodium, potassium or calcium. Such metal compound, ester, ether or alcoholate of Formula III is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a corresponding carbonate or haloformate, e.g. diethyl carbonate or thiocarbonate; ethyl or propyl orthocarbonate; ethyl, tert.butyl, allyl, 2-methoxyethyl, 3-chloropropyl, phenyl or benzyl chloroformate; cyanogen or carbamoyl halides, e.g. cyanogen bromide or diethylcarbamoyl chloride. The starting material, in which $Y_2$ is an ammonium or free or reactively converted hydroxy group, is advantageously reacted with a metal cyanide, e.g. sodium or potassium cyanide, and that in which $Y_2$ is free, esterified or salified hydroxy, or the dehydrated unsaturated derivative thereof (wherein $X_1$ is a corresponding 1-alkenyl group), can also be reacted with carbon monoxide. The latter may be applied under neutral, basic or acidic conditions respectively, e.g. in the presence of sulfuric acid, under high pressure and/or temperature, e.g. up to 400 at and 300°, advantageously in the presence of heavy metal catalysts, e.g. nickel or cobalt salts or carbonyl derivatives thereof. The carbon monoxide may also be generated from appropriate sources, such as formic acid and high boiling mineral acids, e.g. sulfuric or phosphoric acid.

Another substituent $X_1$ is the group

wherein $Y_3$ is a substituent convertible into a free or functionally converted carboxy group. The conversion of $Y_3$ into the latter group can be performed either by oxidation or rearrangement. In the former case $Y_3$ is, for example, methyl, hydroxymethyl, borylmethyl, hydroxyiminomethyl, formyl, lower 1-alkenyl or 1-alkynyl, lower 1,2-dihydroxyalkyl or acyl, such as lower alkanoyl, alkenoyl, free or esterified carboxycarbonyl. In the corresponding starting material of Formula III, containing said potential carboxy function, $Y_3$ is transformed into free or functionally converted carboxy according to standard oxidation methods, for example, with the use of air or pure oxygen, preferably in the presence of catalysts, such as silver, manganese, iron or cobalt catalysts, or with oxidation agents, e.g. hydrogen peroxide or nitric oxides, oxidizing acids or their salts, such as hypohalous, periodic, nitric or percarboxylic acids or suitable salts thereof, e.g. sodium hypochlorite or periodate, peracetic, perbenzoic or monoperphthalic acid, heavy metal salts or oxides, such as alkali metal chromates or permanganates; chromic or cupric salts, e.g. halides or sulfates thereof, or silver, mercuric, vanadium V, chromium VI or manganese IV oxide, in acidic or alkaline media respectively. In said oxidations, usually the free carboxylic acids of Formula I, or salts thereof, are obtained. However, by subjecting, for example, a hydroxyiminomethyl compound (oxime) to Beckmann rearrangement, e.g. treatment with sulfuric acid, p-toluenesulfonyl chloride or phosphorus pentachloride, or to oxidation, e.g. with hydrogen peroxide or any of said percarboxylic acids, or reacting the corresponding formyl or acyl compound (aldehyde or ketone) with hydrazoic acid according to the Schmidt reaction, e.g. in the presence of sulfuric acid, or the aldehyde with a sulfonyl- or nitro-hydroxamate, a nitrile, amide or hydroxamic acid will be formed respectively. A starting material in which $Y_3$ is free or esterified carboxycarbonyl, e.g. lower carbalkoxycarbonyl, can be converted into the acid of Formula I either by oxidation, e.g. with hydrogen peroxide in acidic media, such as mineral acids, or by decarbonylation, which preferably is carried out by pyrolysis, advantageously in the presence of copper or glass powder.

Finally, the substituent $X_1$ in Formula III may be such a moiety, which primarily is capable of liberating the required alkylidene group

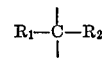

Such moiety is, for example, the free or functionally converted group

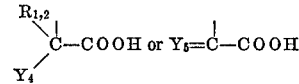

wherein each of $Y_4$ or $Y_5$ are convertible into $R_1$ and/or $R_2$ respectively, for example, by reduction, decarboxylation, deacylation or desulfurization. For example, $Y_4$ is a free or reactively esterified or etherified hydroxy or mercapto group as mentioned above, e.g. hydroxy, mercapto, chloro, bromo, iodo, benzyloxy or benzylmercapto, and $Y_5$ a lower alkylidene, cycloalkylidene, cycloalkyl-alkylidene, oxo or thiono group. The corresponding starting material can be reduced either with catalytically activated or nascent hydrogen, such as hydrogen in the presence of nickel, palladium or platinum catalysts, or with hydrogen generated by electrolysis or the action of metals on acids, alkalis or alcohols, such as zinc, amalgamated zinc, iron or tin on aqueous mineral or carboxylic acids, e.g. hydrochloric or acetic acid, zinc or aluminum-nickel alloys on aqueous alkali metal hydroxides, or sodium, potassium or their amalgams on lower alkanols. Also reducing and/or desulfurizing agents may be applied, depending on the starting material chosen. In case $Y_4$ is hydroxy, the reducing agent may be an aqueous suspension of phosphorus and iodine, hydriodic acid, stannous chloride or sodium sulfite or dithionite, or in case $Y_4$ is esterified hydroxy, e.g. halogeno, an aliphatic or cycloaliphatic metal compound, e.g. a corresponding $R_1$ or $R_2$ lithium or Grignard compound may be used as reducing agent. In case $Y_5$ is oxo, the Clemmensen, Wolff-Kishner or Huang-Minlon procedures may be applied, wherein nascent hydrogen or hydrazine are used, the latter advantageously in the presence of strong alkalis, e.g. high boiling aqueous or glycolic sodium or potassium hydroxide solutions. In the reduction of mercapto, free or ketalized thiono compounds, desulfurization agents are advantageously applied, such as mercuric or copper oxide or Raney nickel. In case $Y_4$ represents carboxy, the corresponding malonic acid derivative is decarboxylated by pyrolysis, advantageously in acidic media, or $Y_4$ stands for another acyl radical, such as lower alkanoyl or aralkanoyl, e.g. acetyl or benzoyl, the β-keto acid is subjected to acid splitting by the action of strong alkalis, e.g. those mentioned above.

Another substituent $X_1$, also providing said alkylidene group, is an unsubstituted or substituted acetyl group, e.g.

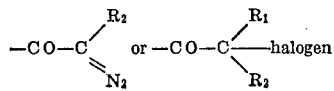

The corresponding unsubstituted acetyl starting material is converted into the compounds of the invention according to the Willgerodt-Kindler reaction, e.g. by the action of sulfur in the presence of ammonia, primary or secondary amines and advantageously of sulfonic acids, e.g. p-toluene sulfonic acid, and said substituted acetyl compounds according to the Wolff (Arndt-Eistert) reaction, e.g. by hydrolysis, alcoholysis, ammonolysis or aminolysis of corresponding α-diazo-ketones, advantageously while irradiated or heated in the presence of copper or silver catalysts, or according to the Favorskii (Wallach) reaction respectively, e.g. by the action of strong alkalis or soluble silver salts, such as silver nitrate, on corresponding α-haloketones.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, sulfide, halides or oxyhalides or other acyl halides, in order to obtain the corresponding esters, halides, anhydrides, amides, thioamides or the nitrile respectively. Resulting amides or thiomides (Willgerodt) can be hydrolyzed under acidic or alkaline conditions, e.g. with the use of aqueous mineral and/or carboxylic acids or alkali metal hydroxides; alcoholized, transaminated or desulfurized, e.g. with the use of mercuric oxide or alkyl halides followed by hydrolysis. Resulting nitriles likewise can be hydrolyzed or alcoholized, e.g. with the use of concentrated aqueous or alcoholic acids or alkalis, or alkaline hydrogen peroxide. A resulting ester, salt or nitrile, containing in α-position at least one hydrogen atom, can be metallized therein, e.g. with the use of alkali metals or their derivatives, such as phenyl lithium, triphenylmethyl sodium or sodium hydride, amides or alcoholates, and thereupon reacted with reactive esters of $R_1$—OH and/or $R_2$—OH. Resulting compounds may also be halogenated in the Ph-moiety, e.g. with the use of halogens, which are advantageously applied in the presence of Lewis acids, e.g. ferric, aluminum, antimony III or tin IV halides, or with the use of halogenation agents, e.g. hydrochloric acid and hydrogen peroxide or sodium chlorate, nitrosyl chloride or bromide, bromosuccin- or phthalimide. Furthermore, nitration may be applied to final products, advantageously with the use of nitric acid or nitrates under acidic condition, e.g. in the presence of sulfuric or trifluoroacetic acid respectively. Resulting nitro compounds may be reduced, for example, with catalytically activated or nascent hydrogen and, if desired, the primary amino compounds obtained, either treated with reactive esters of corresponding alcohols or glycols, or with reactive functional acid derivatives, in order to obtain secondary, tertiary, quaternary or acylated amino compounds respectively. Said prim. amines can also be treated with nitrous acid, to yield diazonium salts, which latter can be converted according to the Sandmeyer reaction, into the corresponding hydroxy, halogeno, cyano, alkoxy or alkylmercapto compounds, e.g. by hydrolyzing the diazonium salt at elevated temperatures, or reacting it with cuprous halides or cyanide, or with a lower alkanol or alkylmercaptan respectively, preferably under neutral or slightly acidic or alkaline conditions. In resulting phenolic products, the hydroxy or mercapto group can be etherified, e.g. by reacting the corresponding alkali metal phenolates with lower alkyl e.g. methyl halides or sulfonates, or resulting phenol ethers are hydrolyzed, e.g. with the use of strong acids or acidic salts, e.g. hydrobromic and acetic acid or pyridine hydrochloride. Resulting hydrogenated compounds may be fully or partially dehydrogenated by the treatment with palladium, sulfur, selenium or selenium dioxide, advantageously in high boiling diluents, e.g. xylene or diphenyl ether, or resulting unsaturated compounds fully or partially hydrogenated by the controlled uptake of catalytically activated hydrogen, which usually enters unsubstituted aromatic moieties easier than the substituted, e.g. halogenated, moieties.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid. A resulting compound containing a basic group, such as an amino group, can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-amino-benzoic, anthranilic, 4-hydroxybenzoic, salicylic, aminosalicylic, embonic, nicotinic, methanesulfonic, ethanesulfonic, hydroxyethanesulfonic, ethylenesulfonic, benzenesulfonic, halogenbenzenesulfonic, toluenesulfonic, naphthalenesulfonic and sulfanilic acid; methionine, tryptophan, lysine or arginine.

These or other salts, for example, the picrates, can also be used for purification purposes. The free compounds are converted into salts, the salts are separated and the free compounds liberated from the salts. In view of the close relationship between the free compounds and their salts, whenever a free compound is referred to in this context, a corresponding salt is also intended, provided such is possible or appropriate under the circumstances.

Resulting mixtures of isomers can be separated into the single isomers by method in themselves known, e.g. by fractional distillation, crystallization and/or chromatography. Racemic products can likewise be resolved into the optical antipodes, for example by separation of diastereomeric salts thereof, e.g. by the fractional crystallization of the d-α-(1-naphthyl)-ethylamine or 1-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or advantageously elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in most of the above-described oxidation methods, wherein $Y_3$ is converted into a free or functionally converted carboxy group, the corresponding aldehydes ($Y_3$ is formyl) are formed intermediarily. According to the haloform reaction ($Y_3$ is acetyl) intermediarily formed trihaloketones are hydrolyzed under the applied alkaline conditions, to yield the corresponding salts or esters of the acids of Formula I. The α-diazoketones are usually formed, according to Arndt-Eistert, from the corresponding benzoic acid halides and aliphatic or cycloaliphatic ($R_2$) diazo compounds, whereupon the above-described Wolff rearrangement is performed. In the process of the invention those starting materials are preferably used, which yield the above-described preferred embodiments of the invention.

The starting material used is known or, if new, may be prepared according to methods known per se. For example, the tricyclic aromatic parent compound is prepared either according to Adkins by partial reduction of a phenanthrene over copper chromite, according to Bardhan-Sengputa or Bogert-Cook by condensation of a 2- or 1-hydroxy-cyclohexyl or -hexenyl-alk-$PhH_2$ compound (obtained, for example, from $H_2Ph$-alk-MgCl and cyclohexanone), with the use of phosphorus pentoxide or sulfuric acid respectively, by condensation of a 2-tetralone with a lower alkanone or alk-2-enone, e.g. 2-butanone or 2-but-3-enone or an enol ether thereof or by reacting a $H_2Ph$-Grignard compound with a 2-oxocyclohexyl-acetic acid ester, reducing the resulting lactone to the 2-$H_2$-Ph-cyclohexyl-acetic acid, condensing it with the use of polyphosphoric acid to the corresponding hydrogenated 9-oxo-phenanthrene, whose oxo groups can be eliminated either by reduction according to Wolff-Kishner, i.e. by alkaline decomposition of the hydrazone or with sodium borohydride, dehydration of the alcohol and hydrogenation of the resulting cyclic olefine. In case $X_1$ is a reactively esterified hydroxy group, it may also be introduced either by halogenation, or nitration followed by reduction, diazotization and Sandmeyer reaction. The resulting starting material may be subsequently converted into the metallic compounds, e.g. by reaction with alkali or alkaline earth metals, such as lithium or magnesium, or with dialkyl zinc or cadmium. The allyl ethers for the Claisen rearrangement can be prepared analogous to those described in J. Chem. Soc. 4210 (1963).

The starting material in which $Y_2$ is a metallic group may be prepared as shown above, i.e. by reacting reactive esters of the corresponding benzylalcohols with alkali or alkaline earth metals or dialkyl zinc or cadmium. Otherwise, the resulting hydrogenated phenanthrene is acylated according to Friedel-Crafts, e.g. with the use of $R_2$—COCl or phosgene and aluminum chloride, or any halogenated phenanthrene is converted into the corresponding Grignard compound, which can be reacted with aliphatic or cycloaliphatic aldehydes or ketones, to yield the corresponding alcohols. The hydroxy group thereof may be reactively esterified or salified according to well-known methods, e.g. by reaction with phosphorus, thionyl or sulfonyl halides, alkali or alkaline earth metals respectively and the resulting esters or salts may be converted into ethers either by reaction with alcoholates or reactive esters respectively. The compounds in which $Y_2$ is an ammonium group, can be obtained from the former reactive esters and secondary amines and the resulting tertiary amines are quaternized in the usual manner, e.g. by reaction with lower alkyl or aralkyl halides.

The starting material containing $Y_3$ can be obtained from the former compounds in which $Y_2$ is a metallic group, by reacting them with a methyl halide, formaldehyde, a formyl halide, lower alkanal, alkenal or hydroxyalkanal or a lower alkanoyl, alkenoyl or oxalyl halide respectively and, if desired, dehydrating resulting alcohols by the action of acidic agents, e.g. sulfuric acid or phosphorus pentoxide, to yield unsaturated derivatives thereof. The latter, e.g. methylidene compounds, may be reacted with boranes in order to obtain borylmethyl compounds and aldehydes with hydroxylamine, to yield the hydroxyiminomethyl compounds (oximes). The aldehydes, i.e. compounds in which $Y_3$ is formyl, can also be obtained from the above-mentioned ketones, i.e. those of Formula III in which $X_1$ is —CO—$R_2$, by reaction with dimethylsulfoniummethylide or dimethyloxysulfoniummethylide (generated from the corresponding trimethylsulfonium salts) and rearranging the resulting ethyleneoxides to the corresponding aldehydes by the action of Lewis acids, e.g. p-toluene sulfonic acid or boron trifluoride, or according to the Darzens condensation by reacting the above ketones with α-halo-alkanoic or alkenoic acid esters in the presence of alcoholates, e.g. potassium tert. butoxide, saponifying the glycidic esters formed and rearranging and decarboxylating them, advantageously in acidic media, e.g. sulfuric acid.

The starting material containing $Y_4$, which represents free, esterified or etherified hydroxy or mercapto, can be prepared according to the cyanohydrin or analog syntheses, e.g. by reaction of said ketones or their thiono analogs, with aqueous potassium cyanide under acidic conditions and, if desired, converting resulting nitriles into other acid derivatives and/or alcohols into corresponding mercapto compounds or reactive esters or ethers thereof, or dehydrating them to unsaturated derivatives. The compounds in which $Y_5$ is oxo or thiono can be obtained according to Friedel-Crafts with the use of suitable hydrogenated phenanthrenes and oxalyl halides. The resulting phenylglyoxylic acid esters may then be reduced with $R_2$-Grignard compounds, if desired, followed by dehydration. Said compounds may also be prepared according to the Ando synthesis by reaction with mesoxalates in the presence of stannic chloride. The resulting adduct can either be hydrogenated, the malonate formed metalized and reacted with a reactive ester of $R_2$—OH or saponified and decarboxylated.

Finally the α-diazoketones are obtained from corresponding phenanthroic acid halides and $R_2$-diazo compounds and the α-haloketones by halogenating of the corresponding ketones or reacting the former α-diazoketones with hydrohalic acids. Most of the highly hydrogenated compounds of the invention, e.g. the α-octahydrophenanthryl-aliphatic acids, and several starting materials, exist in various epimeric forms which either result from different synthetic methods in pure form or in the form of mixtures, which latter can be isolated by fractional crystallization or chromatography from the reaction mixture. In said octahydrophenanthrene compounds, the hydrogen atoms in the 4a and 10a positions can be positioned either on one side or on both sides of the main plain of the molecule, i.e. providing 4a,10a-cis and trans epimers. Moreover, any substituent at the α-carbon atom of the acidic chain can also be in a cis- or trans-position relative to said plain and hydrogen atoms, thus providing further high and low melting epimers. Of said α-octahydrophenanthryl-aliphatic acids especially the 4a-10a-cis-epimers are pharmacologically highly active and if they are forming α-epimers, the high melting forms are also preferred.

It was found that the latter α-epimers form an equilibrium, which is in favor of the low melting form in a ratio of about 4:1. In separating the high melting form by fractional crystallization, the low melting form usually remains in the mother liquors. It can, however, again be equilibrized to the former ratio, for example, by treatment with bases, preferably alkali metal alcoholates in alcoholic solutions, e.g. sodium ethylate in ethanol, to provide again some of the desired high melting epimer.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

Example 1

The mixture of 13.3 g. α-(1,2,3,4,4a,9,10,10a-octahydro-6- and -7-phenanthryl)-propionitrile, 50 ml. ethylene glycol and 50 ml. 50% aqueous sodium hydroxide is refluxed for 20 hours while stirring. It is poured onto ice, the mixture acidified with concentrated hydrochloric acid and extracted with diethyl ether. The extract is shaken with 0.5 N-aqueous sodium hydroxide, the aqueous solution acidified with hydrochloric acid and extracted with diethyl ether. The extract is dried, filtered, evaporated, the residue distilled and the fraction boiling at 190–195°/0.2 mm. Hg collected. 4.4 g. thereof are distributed between 40 ml. hexane (A) and 40 ml. of 1.5 g. potassium bicarbonate in water. The aqueous solution is separated, acidified with hydrochloric acid and the mixture extracted with diethyl ether. The extract is dried, filtered, evaporated, the residue taken up in the minimum amount of acetone and the solution neutralized with cyclohexylamine in acetone. The precipitate formed is filtered off and recrystallized from methyl-ethyl ketone and acetone to yield the cyclohexylammonium α - (1,2,3,4,4a,9,10,10a-octahydro-7-phenanthryl)-propionate of the formula

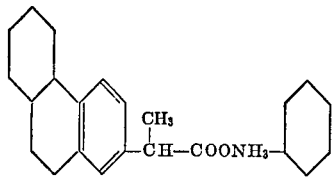

melting at 192–195°.

The hexane solution (A) is evaporated in vacuo, to yield the major portion of the above distillate, consisting predominantly of the α-(1,2,3,4,4a,9,10,10a-octahydro-6-phenanthryl)-propionic acid of the formula

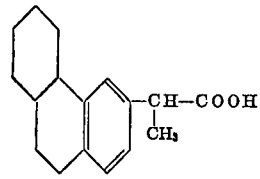

showing in the I.R.-spectrum inter alia a strong band at 1705 cm.⁻¹.

The starting material is prepared as follows: The mixture of 19 g. 1,2,3,4,4a,9,10,10a-octahydro-phenanthrene, 9.0 g. acetyl chloride and 50 ml. carbon disulfide is added dropwise during 25 minutes to the mixture of 15 g. aluminum chloride and 100 ml. carbon disulfide while stirring and cooling with an ice bath. The mixture is stirred for 2 hours at room temperature and then poured onto ice. Carbon disulfide is removed in vacuo and the oily product extracted with diethyl ether. The extract is washed, dried and evaporated, the residue distilled and the fraction boiling at 160/170°/0.4 mm. Hg collected; it represents the mixture of mainly 6- and 1-acetyl-1,2,3,4,4a,9,10,10a-octahydro-phenanthrene. A semicarbazone thereof melts at 218–222°.

The mixture of 19 g. thereof, 100 ml. ethanol and 5.0 g. sodium borohydride is stirred at room temperature for 20 hours. Hereupon 2 ml. aqueous acetic acid are added, the mixture evaporated in vacuo and the residue taken up in diethyl ether. The solution is washed with aqueous sodium bicarbonate and brine, dried, filtered and evaporated to yield the 1-(1,2,3,4,4a,9,10,10a-octahydro-6- and -7-phnanthryl)-ethanol.

The mixture of 19 g. thereof, 180 ml. benzene and 50 ml. thionyl chloride is refluxed for 5 hours and evaporated in vacuo. The residue is taken up in diethyl ether, the solution washed with aqueous sodium bicarbonate, dried, filtered and evaporated. The residue is distilled and the fraction boiling at 155–160°/0.25 mm. Hg collected; it represents the 1-chloro-1(1,2,3,4,4a,9,10,10a-octahydro-6- and -7-phenanthryl)-ethane.

The mixture of 16.6 g. thereof, 50 ml. dimethylsulfoxide and 3.1 g. sodium cyanide is stirred for 6 hours at about 70°. It is cooled, poured into saturated aqueous sodium chloride and the mixture extracted with diethyl ether. The extract is dried, filtered, evaporated, the residue distilled and the fraction boiling at 145–150°/0.2 mm. Hg collected; it represents the α-1,2,3,4,4a,9,10,10a-octahydro-6- and -7-phenanthryl)-propionitrile, showing in the I.R.-spectrum inter alia a strong band at 2240 cm.⁻¹.

The 1,2,3,4,4a,9,10,10a-octahydro-phenanthrene used is described by Cook et al., J. Chem. Soc. 1939, 168. The resulting mixture of the 4a,10a-cis and -trans epimers is treated with aluminum chloride and the mixture heated to about 50° in order to enrich the 4a,10a-trans epimer.

Example 2

2.5 g. of the cyclohexylammonium α-(1,2,3,4,4a,9,10,10a-octahydro - 7 - phenanthryl)-propionate, obtained according to Example 1, is added to the mixture of 100 ml. 2 N sulfuric acid and 100 ml. diethyl ether while shaking. The ethereal layer is separated, washed with water, dried, filtered and evaporated, to yield a crude acid melting at 80–95°. 0.2 g. thereof are used to seed another 5.2 g. batch of the oily acid of Example 1 (boiling at 190–195°/0.2 mm. Hg), to yield a crystalline acid melting at 108–125°. It is recrystallized 3 times from hexane and once from aqueous ethanol, to yield the 4a,10a-cis-α-(1,2,3,4,4a,9,10,10a-octahydro-7-phenanthryl) - propionic acid of the formula

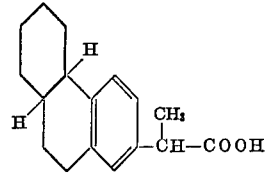

melting at 142–143°.

Example 3

The mixture of 3.1 g. 4a,10a-cis-α-(1,2,3,4,4a,9,10,10a-octahydro - 7 - phenanthryl)-propionitrile, 5 ml. glacial acetic acid, 5 ml. concentrated sulfuric acid and 5 ml. water is refluxed for 2½ hours while stirring. It is poured into ice water, the mixture extracted with diethyl ether and the extract shaken with ½ N aqueous sodium hydroxide. The aqueous phase is acidified with concentrated hydrochloric acid, extracted with diethyl ether, the extract washed with water, dried, filtered and evaporated. The residue is recrystallized several times from hexane and aqueous ethanol, to yield the 4a,10a-cis-α-(1,2,3,4,4a,9,10,10a-octahydro-7-phenanthryl)propionic acid melting at 142–143°; it is identical with that obtained according to Example 2.

The starting material is prepared as follows: To the refluxing mixture of 17.1 g. magnesium, 500 ml. diethyl ether and a few drops methyl iodide, 136, 4 g. 1-bromo-4-chlorobenzene are added at such a rate to maintain reflux, and refluxing is continued until the magnesium has been consumed. The mixture is filtered through glass wool and the filtrate added dropwise to the solution of 120 g. ethyl (2-oxo-cyclohexyl)-acetate, in 500 ml. diethyl ether while stirring at about 0°, and stirring is continued for 1 hour. Thereupon 650 ml. 2 N sulfuric acid are added, the organic layer separated, dried, evaporated and the residue recrystallized from hexane and isopropanol, to yield the 7α-(4-chlorophenyl)-2-oxo - 2,3,3a,4,5,6,7,7a - octahydrobenzo[b]furan, i.e. a lactone, M.P. 113–115°.

To the mixture of 40.6 g. thereof, 800 ml. dioxane, 800 ml. concentrated hydrochloric acid and 400 ml. water, the amalgamated zinc (prepared from 240 g. zinc powder and 20 g. mercuric chloride in 400 ml. water containing 12 ml. concentrated hydrochloric acid) is added portionwise while stirring and refluxing. Thereupon 100 ml. concentrated hydrochloric acid are added and refluxing is continued overnight. After cooling, the mixture is extracted with benzene, the extract shaken with aqueous sodium carbonate and the aqueous solution acidified with hydrochloric acid. It is extracted with diethyl ether, the extract dried, filtered and evaporated. The residue is taken up in petroleum ether, the mixture cooled in a Dry Ice-acetone bath, the precipitate formed filtered off and recrystallized from aqueous isopropanol, to yield the cis-[2-(4-chlorophenyl)-cyclohexyl]-acetic acid (A) melting at 154–157°. The petroleum ether filtrate is evaporated to yield about the same amount of the corresponding trans-acid (B).

The mixture of 24 g. (A) and 240 g. polyphosphoric acid is stirred for 2 hours at 110°, cooled and poured over ice. It is extracted with diethyl ether, the extract washed with aqueous sodium carbonate, dried, evaporated and the residue recrystallized from petroleum ether with the aid of charcoal, to yield the 4a,10a-cis-7-chloro-9-oxo-(1,2,3,4,4a,9,10,10a - octahydro) - phenanthrene melting at 67–69°.

To the solution of 10 g. thereof, in 250 ml. 95% aqueous ethanol, 2 g. sodium borohydride are added portionwise while stirring and cooling in an icebath. Stirring is continued for 4 hours and the mixture allowed to stand overnight at room temperature. Hereupon 2 ml. diluted acetic acid are added, the mixture evaporated in vacuo, the residue taken up in water and the mixture extracted with ethyl acetate. The extract is washed with 2 N hydrochloric acid, aqueous sodium carbonate and water, dried, filtered and evaporated to yield the 4a,10a-cis-7-chloro-9 - hydroxy - 1,2,3,4,4a,9,10,10a - octahydrophenanthrene melting at 159–161°.

The mixture of 6.3 g. thereof and 50 ml. 90% aqueous formic acid is refluxed for ½ an hour and poured into 300 ml. water. It is extracted with diethyl ether, the extract washed with saturated aqueous sodium bicarbonate, dried, evaporated, the residue distilled and the fraction boiling at 120–130°/0.1 mm. Hg collected; it represents the 4a,10a - cis - 7-chloro-1,2,3,4,4a,10a-hexahydrophenanthrene.

The mixture of 6.2 g. thereof, 25 ml. 95% aqueous ethanol and 2 ml. 17% hydrochloric acid is hydrogenated over 0.5 g. 10% palladium on charcoal until 600 ml. hydrogen have been absorbed. It is filtered, the filtrate evaporated in vacuo, the residue distilled twice and the fraction boiling at 135°/0.25 mm. Hg collected, to yield the 4a,10a - cis - 7-chloro-1,2,3,4,4a,9,10,10a-octahydrophenanthrene. In the analgous manner the corresponding 4a,10a-trans compound is obtained from trans-acid (B); it melts at 48–50° after recrystallization from petroleum ether.

The mixture of 25.3 g. of said cis-compound, 100 ml. diethyl ether and 1.7 g. lithium (containing 1% sodium) is refluxed under nitrogen for 24 hours, during which time a total of 150 ml. diethyl ether is added portionwise. The organo lithium derivative is added in portions to Dry Ice, overlayered with diethyl ether and Dry Ice is added from time to time during 1 hour. After allowing the mixture to warm up to room temperature, water is carefully added and the aqueous layer is separated, acidified with concentrated hydrochloric acid and extracted with ethyl acetate-diethyl ether (1:1). The extract is evaporated, the residue taken up in the minimum amount of boiling benzene, the solution diluted with hexane, the precipitate formed filtered off and recrystallized from aqueous isopropanol, to yield the 4a,10a - cis-1,2,3,4,4a,9,10,10a-octahydrophenanthrene-7-carboxylic acid melting at 229–230°.

To the suspension of 5.5 g. thereof and 100 ml. diethyl ether, the filtered solution, obtained from 1.4 g. lithium (containing 1% sodium) and 14.2 g. methyl iodide in 150 ml. diethyl ether, is added dropwise while stirring under nitrogen and the whole is refluxed for 1 hour. After cooling it is poured over ice, shaken well and the aqueous phase extracted with diethyl ether. The combined organic phase is washed with aqueous sodium carbonate, dried, filtered, evaporated and the residue recrystallized from petroleum ether, to yield the 4a,10a-cis-7-acetyl-1,2,3,4, 4a,9,10,10a-octahydro-phenanthrene melting at 49–50°.

To the mixture of 4.5 g. thereof and 50 ml. 95% aqueous ethanol 2 g. sodium borohydride are added, the whole stirred for 5 hours at room temperature and allowed to stand overnight. Thereupon 1 ml. water and 5 ml. diluted acetic acid are added and the mixture evaporated in vacuo. The residue is taken up in brine, the mixture extracted with diethyl ether, the extract dried and evaporated, to yield the 4a,10a-cis-7-(1-hydroxyethyl)-1,2,3,4,4a,9,10,10a-octahydro-phenanthrene as an oil.

The mixture of 4.5 g. thereof, 30 ml. benzene and 10 ml. thionyl chloride is slowly heated to reflux and refluxed for 4 hours. It is evaporated in vacuo, the residue several times taken up in benzene and the solution evaporated. 4.3 g. of the residue is taken up in 16 ml. dimethylsulfoxide and 0.8 g. sodium cyanide are added while stirring. The mixture is stirred for 6 hours at about 75°, diluted with water and extracted with diethyl ether. The extract is dried, filtered, evaporated, the residue distilled and the fraction boiling at 150°/0.2 mm. Hg collected, to yield the α-(4a,10a-cis-1,2,3,4,4a,9,10,10a-octahydro-7-phenanthryl)propionitrile.

EXAMPLE 4

The mixture of 5.3 g. α-(4a,10a-cis-1,2,3,4,4a,9,10,10a-octahydro-6-phenanthryl)-propionitrile, 31 ml. ethylene glycol and 21.4 ml. 50% aqueous sodium hydroxide is refluxed for 24 hours and poured into water. It is washed with diethyl ether, acidified with concentrated hydrochloric acid and extracted with diethyl ether. The extract is washed with water and brine, dried, filtered, evaporated in vacuo and the residue recrystallized from n-pentane, to yield the α-(4a,10a-cis-1,2,3,4,4a,9,10,10a-octahydro - 6-phenanthryl)-propionic acid of the formula

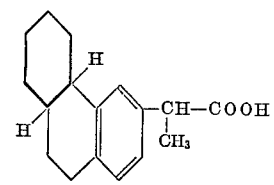

melting at 116–118°.

The starting material is prepared as follows: The mixture of 33.2 g. lithium aluminum hydride and 450 ml. diethyl ether is refluxed and stirred for one hour, whereupon the solution of 116.6 g. of ethyl 4-chlorophenylacetate in 215 ml. diethyl ether is added dropwise while stirring. The mixture is refluxed 5 hours longer, allowed to stand at room temperature for 2 days, and again refluxed for 4 hours. Thereupon 25 ml. ethyl acetate are added dropwise, followed by 33 ml. water, 25 ml. 20% aqueous sodium hydroxide and 115 ml. water, the mixture is filtered and the residue washed with diethyl ether. The filtrate is washed with water until neutral, swirled with brine, dried, filtered, evaporated in vacuo, the residue distilled and the fraction boiling at 97–101°/0.1 mm. Hg collected, to yield the 2-(4-chlorophenyl)-ethanol. (The correspondingly prepared meta isomer boils at 82–88°/0.4 mm. Hg.)

To the mixture of 77 g. thereof and 75 ml. benzene, the solution of 59 g. phosporus tribromide in 75 ml. benzene is added dropwise while stirring and then kept at 60° for 4 hours. It is poured over ice, the mixture extracted with diethyl ether, the extract washed with water, 10% aqueous sodium hydroxide, water, 2 N hydrochloric acid and saturated aqueous sodium bicarbonate, dried, filtered, evaporated, the residue distilled and the fraction boiling at 76–78°/0.3 mm. Hg collected, to yield the 2-(4-chlorophenyl)-ethyl bromide (meta isomer B.P. 82–90°/0.35 mm. Hg).

To the Grignard reagent prepared from 63 g. thereof, 6.4 g. magnesium and 150 ml. diethyl ether, the solution of 33.6 g. cyclohexanone in 150 ml. diethyl ether are added dropwise while stirring under nitrogen and cooling in an ice bath. The mixture is refluxed for 4 hours, cooled and combined with 50 ml. saturated aqueous ammonium chloride and acetic acid to adjust the pH to about 8. The aqueous layer is extracted with diethyl ether, the combined organic solutions washed with water and brine, filtered and evaporated in vacuo. The residue is distilled, the fraction boiling at 140–165°/0.35 mm. Hg collected and recrystallized from pentane, to yield the 1-[2-(4-chlorophenyl)-ethyl]-cyclohexanol melting at 62–67° (meta isomer M.P. 43–46°).

5 g. thereof are added portionwise during ½ an hour to 10 ml., 85% aqueous sulfuric acid while cooling and stirring and the mixture is stirred at 50° for 1 hour. It is extracted with petroleum ether, the extract washed with water and saturated aqueous sodium bicarbonate, dried, filtered, evaporated, the residue distilled and the fraction boiling at 118–128°/0.25 mm. Hg collected, to yield the 4a,10a - cis - 6 - chloro - 1,2,3,4,4a,9,10,10a-octahydro phenanthrene. (The corresponding 7-isomer obtained from the metachloro compound is identical with that obtained according to Example 3.)

To the Grignard reagent prepared from 12 g. of said 6-chloro compound, 2 g. magnesium, 23 ml. tetrahydrofuran, 0.1 ml. 1,2-dichloroethane and 0.1 ml. methyl iodine, the solution of 2.3 g. acetaldehyde in 11 ml. tetrahydrofuran is added while stirring and the mixture is refluxed for one hour. It is poured onto ice and concentrated hydrochloric acid, the organic phase collected and evaporated in vacuo. The residue is taken up in diethyl ether, the solution washed with water, saturated aqueous sodium bicarbonate and brine, dried, filtered and evaporated, to yield the 4a,10a-cis-6-(1-hydroxyethyl)-1,2,3,4,4a,9,10,10a-octahydro-phenanthrene.

The mixture of 10.1 g. thereof, 92 ml. benzene and 26 ml. thionyl chloride is refluxed for 5 hours and evaporated in vacuo. The residue is taken up in water, the mixture extracted with diethyl ether, the extract washed with water and saturated aqueous sodium bicarbonate, dried, filtered and evaporated, to yield the 4a,10a-cis-6-(1-chloroethyl)-1,2,3,4,4a,9,10,10a-octahydro-phenanthrene.

The mixture of 10.3 g. thereof, 32 ml. dimethyl sulfoxide and 2.06 g. sodium cyanide is stirred at about 65–70° for 8 hours. It is poured into water, the mixture extracted with diethyl ether, the extract washed with water and brine, dried, treated with charcoal, filtered, evaporated, the residue distilled and the fraction boiling at 145–155/0.35 mm. Hg collected, to yield the α - (4a,10a - cis - 1,2,3,4,4a,9,10,10a-octahydro-6-phenanthryl)-propionitrile.

Example 5

The mixture of 1.8 g. α-(4a,10a-trans-1,2,3,4a,9,10,10a-octahydro-6-phenanthryl)-propionitrile, 5 g. sodium hydroxide, 5 ml. water and 10 ml. ethylene glycol is refluxed for 20 hours while stirring, and poured into water. It is washed with diethyl ether, acidified with 2 N hydrochloric acid and extracted with diethyl ether and ethyl acetate. The combined extracts are washed with water, dried, evaporated, and the residue recrystallized from hexane-pentane and aqueous ethanol, to yield the α-(4a,10a - trans - 1,2,3,4,4a,9,10,10a - octahydro-6-phenanthryl)-propionic acid of the formula

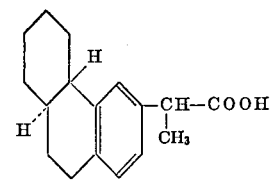

melting at 108–112°.

The starting material is prepared as follows: 4a,10a-trans - 6 - chloro - 1,2,3,4,4a,9,10,10a-octahydrophenanthrene, obtained analogous to the method of Example 3, is converted into the corresponding 6-acetyl compound as described in said example for the 7-isomer. The mixture of 40 g. of said impure 6-acetyl compound, 20 g. hydroxylamine hydrochloride and 220 ml. piperidine is heated on the steam cone for three hours and evaporated in vacuo. The residue is taken up in water, the mixture extracted with benzene-diethyl ether (2:1), the extract washed with ½ N hydrochloric acid and brine, dried, filtered and evaporated. The residue is taken up in 150 ml. petroleum ether, the solution kept in the refrigerator overnight and the precipitate filtered off. It is recrystallized first from hexane and then from aqueous ethanol, to yield the oxime of the 4a,10a-trans-6-acetyl-1,2,3,4,4a,9,10,10a-octahydrophenanthrene, melting at 122–123°.

The mixture of 3 g. thereof and 50 ml. 2 N hydrochloric acid is refluxed for 5 hours and extracted with diethyl ether. The extract is washed with water, saturated aqueous sodium bicarbonate, dried, filtered and evaporated, to yield the pure 4a,10a-trans-6-acetyl-1,2,3,4,4a,9,10,10a-octahydrophenthrene, melting at 44–47°.

The mixture of 4 g. thereof, 150 ml. 95% aqueous ethanol and 1.5 g. sodium borohydride is stirred at room temperature overnight. Hereupon 5 ml. diluted acetic acid are added, the mixture evaporated in vacuo, the residue taken up in diethyl ether, the solution washed with aqueous sodium bicarbonate, dried, filtered and evaporated, to yield the 4a,10a-trans-6-(1-hydroxyethyl)-1,2,3,4,4a,9,10,10a - octahydro - phenanthrene melting at 60–62°.

The mixture of 10 g. thereof, 100 ml. benzene and 25 ml. thionyl chloride is refluxed for 4½ hours and evaporated in vacuo. The residue is taken up in benzene and the mixture again evaporated. The residue is taken up in diethyl ether, the solution washed with ice water, saturated aqueous sodium bicarbonate and brine, dried, filtered, evaporated, the residue distilled and the fraction boiling at 120–130°/0.2 mm. Hg collected. It is recrystallized from petroleum ether, to yield the 4a,10a-trans-6-(1-chloroethyl) - 1,2,3,4,4a,9,10,10a - octahydro - phenanthrene, melting at 56–58°.

The mixture of 9.8 g. thereof, 35 ml. dimethylsulfoxide and 2 g. sodium cyanide is stirred at about 76° for 7 hours. It is poured into water, the mixture extracted with diethyl ether, the extract washed with water and brine, treated with charcoal, filtered, evaporated, the residue distilled and the fraction boiling at 150–155°/0.3 mm. Hg collected. It is recrystallized from petroleum ether to yield the α - (4a,10a - trans-1,2,3,4,4a,9,10,10a-octahydro-6-phenanthryl)-propionitrile, melting at 68–70°.

Example 6

The mixture of 10.5 g. α-(9,10-dihydro-7-phenanthryl)-propionitrile, 10 ml. concentrated sulfuric acid, 10 ml. glacial acetic acid and 10 ml. water is refluxed for 2 hours, diluted with water and extracted with diethyl ether. The extract is shaken with saturated aqueous sodium bicarbonate and 2 N aqueous sodium hydroxide and the combined aqueous layers are acidified with concentrated hydrochloric acid. The mixture is extracted with diethyl ether, the extract washed with water, dried, filtered and evaporated. The residue is recrystallized from aqueous ethanol, to yield the α-(9,10-dihydro-2-phenanthryl)-propionic acid of the formula

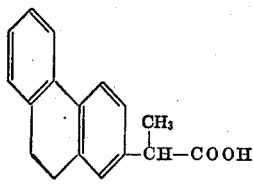

melting at 113–115°.

The starting material is prepared as follows: To the mixture of 22.2 g. 2-acetyl-9,10-dihydro-phenanthrene and 350 ml. 95% aqueous ethanol, 4 g. sodium borohydride are added portionwise while stirring and cooling. The mixture is stirred for 4 hours at room temperature and allowed to stand overnight. Hereupon 5 ml. diluted acetic acid are added, the mixture evaporated in vacuo and the residue taken up in water. The mixture is extracted with ethyl acetate, the extract washed with 2 N hydrochloric acid, saturated aqueous sodium bicarbonate, water and brine, dried, filtered, evaporated and the residue recrystallized from hexane, to yield the 2-(1-hydroxy-ethyl)-9,10-dihydro-phenanthrene melting at 83–84°.

The mixture of 21.7 g. thereof, 300 ml. benzene and 58.5 ml. thionyl chloride is refluxed for 4 hours while stirring and allowed to stand overnight. It is evaporated in vacuo, the residue taken up in water, the mixture extracted with diethyl ether, the extract washed with saturated aqueous sodium bicarbonate, evaporated, the residue distilled and the fraction boiling at 165°/0.25 mm. Hg collected; it represents the 2-(1-chloroethyl)-9,10-dihydro-phenanthrene.

The mixture of 60.4 g. thereof, 50 ml. dimethyl sulfoxide and 3.3 g. sodium cyanide is stirred at 65° for 8 hours and allowed to stand overnight at room temperature. It is poured into ice water, the mixture extracted with diethyl ether, the extract washed with water, dried, evaporated, the residue distilled and the fraction boiling at 170–180°/0.25 mm. Hg collected, to yield the α-(9,10-dihydro-2-phenanthryl)-propionitrile.

Example 7

The mixture of 11.4 g. 2-acetyl-9,10-dihydrophenanthrene, 1.8 g. sulfur, 0.25 g. p-toluene sulfonic acid and 9 ml. morpholine is refluxing for 3 hours while stirring and allowed to stand overnight at room temperature. It is diluted with water, extracted with diethyl ether, the extract dried, filtered, evaporated and the residue recrystallized from isopropanol, to yield the 9,10-dihydro-2-phenanthryl-thioacetic acid morpholide of the formula

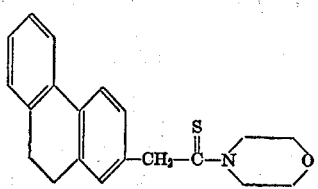

melting at 105–108°.

Example 8

The mixture of 9.3 g. 9,10-dihydro-2-phenanthryl-thioacetic acid morpholide, 120 ml. ethylene glycol and 120 ml. 10% aqueous potassium hydroxide is refluxed for 24 hours. After cooling it is diluted with water, washed with diethyl ether and the aqueous layer acidified with concentrated hydrochloric acid. The mixture is extracted, with diethyl ether, the extract dried, filtered, evaporated and the residue recrystallized from aqueous ethanol, to yield the 9,10-dihydro-2-phenanthryl-acetic acid of the formula

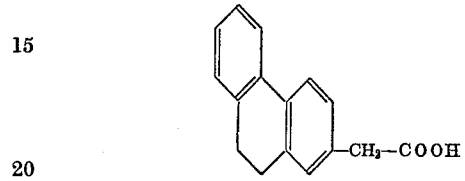

melting at 125–126°.

Example 9

Preparation of 10,000 tablets each containing 50.0 mg. of the active ingredient:

| Formula: | G. |
|---|---|
| α-(1,2,3,4,4a,9,10,10a-octahydro-7-phenanthryl)-propionic acid | 500.00 |
| Lactose | 1,706.00 |
| Corn starch | 90.00 |
| Polyethylene glycol 6,000 | 90.00 |
| Talcum powder | 90.00 |
| Magnesium stearate | 2400 |
| Purified water, q.s. | |

Procedure: All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

Example 10

Preparation of 10,000 tablets each containing 10.0 mg. of the active ingredient:

| Formula: | G. |
|---|---|
| 4a,10a-cis-α-(1,2,3,4,4a,9,10,10a-octahydro-7-phenanthryl)-propionic acid | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purifide water, q.s. | |

Procedure: As described in Example 9 but using instead of 45 ml. water, 40 ml. thereof, instead of 180 ml. water 150 ml. thereof and instead of 7.1 mm. punches, such of 6.4 mm.

Example 11

The mixture of 6.3 g. 4α,10α-cis-8-(1-chloroethyl)-1,2,3,4,4a,9,10,10a-octahydrophenanthrene, 20 ml. dimethylformamide and 1.26 g. sodium cyanide is stirred at about 65–70° for 8 hours. It is poured into water, the mixture extracted with diethyl ether, the extract washed with water and brine, dried, filtered and evaporated, to yield the α - (4a,10a - cis - 1,2,3,4,4a,9,10,10a - octahydro-8-phenanthryl)-propionitrile of the formula

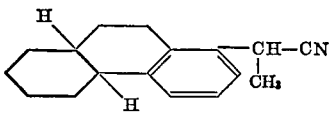

showing in the I.R. spectrum a strong band at 2230 cm.$^{-1}$.

The starting material is prepared as follows: To the Grignard reagent prepared from 3.3 g. magnesium and 30.3 g. 2-(2-chlorophenyl)-ethyl bromide in 50 ml. diethyl ether, the solution of 16.2 g. cyclohexanone in 72 ml. diethyl ether is added dropwise while stirring under nitrogen, and the mixture is refluxed for 4 hours. It is cooled in an ice bath, combined with 25 ml. saturated aqueous ammonium chloride, followed by 25 ml. 20% aqueous acetic acid and the aqueous layer extracted with diethyl ether. The combined organic solutions are washed with water and brine, dried, filtered and evaporated in vacuo. The residue is distilled and the fraction boiling at 138–152°/0.5 mm. Hg collected, to yield the 1-[2-(2-chlorophenyl)-ethyl]-cyclohexanol.

22.8 g. thereof are added portionwise during ½ hour to 55 ml. 85% aqueous sulfuric acid while stirring and cooling in an ice bath. Hereupon the mixture is stirred for 1 hour at 50° C., again cooled in an ice bath and extracted with petroleum ether. The extract is washed with water and saturated aqueous sodium bicarbonate, dried, filtered and evaporated. The residue is distilled and the fraction boiling at 101–115°/0.25 mm. Hg collected, to yield the 4a,10a-cis-8-chloro-1,2,3,4,4a,9,10,10a-octahydro-phenanthrene.

The solution of 7.6 g. thereof in 9.2 ml. tetrahydrofuran is added to the mixture of 1.3 g. magnesium, 5.4 ml. tetrahydrofuran, 0.06 ml. 1,2-dichloroethane and 0.06 ml. methyl iodide while stirring under nitrogen. The mixture is refluxed for 16 hours, whereupon the solution of 1.46 g. acetaldehyde in 7 ml. tetrahydrofuran is added while stirring and cooling and the mixture is refluxed for 1 hour. It is poured onto ice and concentrated hydrochloric acid, and the mixture extracted with diethyl ether. The extract is washed with water and saturated aqueous sodium bicarbonate, dried, filtered, evaporated, the residue distilled and the fraction boiling at 147–165°/0.35 mm. Hg collected, to yield the 4a,10a-cis--8-(1-hydroxyethyl)-1,2,3,4,4a,9,10,10a-octahydrophenanthrene.

The mixture of 6.5 g. thereof, 50 ml. methylene chloride and 3.68 g. thionyl chloride is allowed to stand at room temperature for one day. It is evaporated in vacuo, the residue is taken up twice in 50 ml. benzene and the mixture again evaporated in vacuo. The residue is taken up in water, the mixture extracted with diethyl ether, the extract washed with water and saturated aqueous sodium bicarbonate, dried, filtered and evaporated, to yield the 4a,10a-cis-8-(1-chloroethyl)-1,2,3,4,4a,9,10,10a-octahydrophenanthrene.

Example 12

The mixture of 4.7 g. α-(4a,10a-cis-1,2,3,4,4a,9,10,10a-octahydro-8-phenanthryl)-propionitrile, 31 ml. ethylene glycol and 21.4 ml. 50% aqueous sodium hydroxide is refluxed for 16 hours and poured into water. The mixture is washed with diethyl ether, acidified with concentrated hydrochloric acid and extracted with diethyl ether. The extract is washed with water and brine, dried, filtered and evaporated in vacuo. The amorphous residue is taken up in the minimum amount of diethyl ether, the solution concentrated on the steam bath and the concentrate triturated with petroleum ether while cooling. The precipitate formed is filtered off, washed with cold petroleum ether and recrystallized from pentane and aqueous ethanol, to yield the α-(4a,10a-cis-1,2,3,4,4a,9,10,10a-octahydro-8-phenanthryl)-propionic acid of the formula

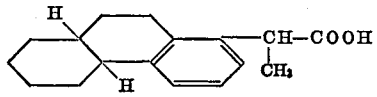

melting at 96–98°.

Example 13

All the hexane and ethanolic mother liquors obtained from the recrystallization of the α-(4a,10a-cis-1,2,3,4,4a, 9,10,10a-octahydro - 7 - phenanthryl)-propionic acid described in Example 3 are combined and evaporated in vacuo. The residue is taken up in 50 ml. 10% anhydrous methanolic hydrogen chloride, the mixture refluxed overnight and evaporated in vacuo. The residue is taken up in diethyl ether, the solution washed with aqueous sodium bicarbonate, dried, filtered, evaporated, the residue distilled and the fraction boiling at 175°/0.35 mm. Hg collected, to yield the corresponding methyl ester of the formula

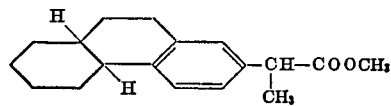

2.5 g. thereof are added to the solution prepared from 100 ml. anhydrous ethanol and 0.3 g. sodium and the mixture refluxed for 3 hours. Hereupon 10 ml. water are added carefully and refluxing is continued for another 3 hours. The mixture is evaporated in vacuo, the residue taken up in water, the solution washed with diethyl ether, acidified with hydrochloric acid and extracted with diethyl ether. The extract is washed with water, dried, filtered and evaporated. The residue is recrystallized 2 times from hexane and 1 time from aqueous ethanol, to yield the α-(4a,10-cis-1,2,3,4,4a,9,10,10a - octahydro - 7 - phenanthryl)-propionic acid melting at 142–143°. By this equilibration method another 20% of the high melting and more active racemate can be obtained from the major low melting product.

Example 14

The mixture of 11.4 g. 7-acetyl-4a,10a-cis-1,2,3,4,4a,9, 10,10a-octahydrophenanthrene, 0.25 g. p-toluene sulfonic acid, 1.8 g. sulfur and 9 ml. morpholine is refluxed for 4 hours while stirring and allowed to stand overnight at room temperature. It is diluted with water, extracted with diethyl ether, the extract washed with water, dried, filtered, evaporated, and the residue recrystallized from hexane and aqueous ethanol, to yield the 4a,10a-cis-1,2,3,4, 4a,9,10,10a-octahydro-7-phenanthryl-thioacetic acid morpholide of the formula

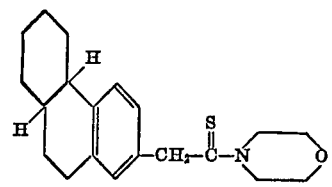

melting at 115–122°.

Example 15

The mixture of 5.5 g. 4a,10a-cis-1,2,3,4,4a,9,10,10a-octahydro-7-phenanthryl-thioacetic acid morpholide, 50 ml. ethylene glycol and 50 ml. 10% aqueous potassium hydroxide is refluxed for 20 hours. After cooling, it is diluted with water, washed with diethyl ether and the aqueous layer acidified with concentrated hydrochloric acid. The mixture is extracted with diethyl ether, the extract dried, filtered, evaporated, the residue distilled and the fraction boiling at 180–190°/0.5 mm. Hg collected, to yield the 4a,10a-cis-1,2,3,4,4a,9,10,10a-octahydro-7-phenanthryl-acetic acid of the formula

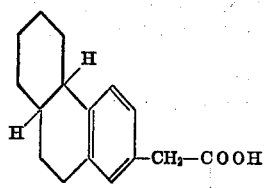

6.8 g. thereof are taken up in 50 ml. diethyl ether and the concentrated solution of 5 ml. cyclohexylamine in n-hexane is added while stirring. The precipitate formed is filtered off and recrystallized from methyl ethyl ketone, to yield the corresponding cyclohexylammonium salt melting at 178–181°.

5.6 g. thereof are taken up in the minimum amount of water, the solution acidified with N sulfuric acid and the mixture extracted with diethyl ether. The extract is washed with water, dried, filtered, evaporated and the residue recrystallized from petroleum ether, to yield again the 4a,10a-cis-1,2,3,4,4a,9,10,10a-octahydro - 7 - phenanthryl-acetic acid melting at 74–76°.

Example 16

To the solution of 3 g. 2-(4a,10a-cis-1,2,3,4,4a,9,10,10a-octahydro - 7 - phenanthryl)-propanol in the minimum amount of acetic acid, a concentrated solution of 4 g. chromium trioxide in 20% aqueous sulfuric acid is added dropwise at 0° while stirring, and the mixture is allowed to stand overnight at room temperature. It is diluted with water, extracted with diethyl ether, the extract washed with water, dried, filtered and evaporated. The residue is recrystallized several times from hexane and aqueous ethanol, to yield the α-(4a,10a-cis-1,2,3,4,4a,9,10,10a-octahydro-7-phenanthryl)-propionic acid melting at 142–143°; it is identical with the compound obtained according to Examples 2 and 3.

The starting material is prepared as folows: To the stirred suspension of 65 g. 4a,10a,-cis-1,2,3,4,4a,9,10,10a-octahydrophenanthrene-7-carboxylic acid in 1 liter diethyl ether, the solution of 0.9 mol methyl lithium in 800 ml. diethyl ether is added dropwise while stirring. After completed addition, the mixture is refluxed for 1 hour and poured into water. The aqueous phase is extracted with diethyl ether and the combined organic solutions dried, evaporated, the residue distilled and the fraction boiling at 165–170°/0.2 mm. Hg collected. The residue is taken up in 250 ml. pyridine, 30 g. hydroxylamine hydrochloride are added portionwise, the mixture refluxed for 2 hours and allowed to stand overnight at room temperature. It is evaporated in vacuo, the residue taken up in water, the mixture extracted with diethyl ether, the extract washed with N hydrochloric acid and brine, filtered and evaporated in vacuo. The residue is recrystallized from hexane and aqueous ethanol, to yield the oxime of the 7-acetyl-4a,10a - cis - 1,2,3,4,4a,9,10,10a-octahydrophenanthrene melting at 127–128°.

The mother liquors obtained are evaporated in vacuo, the residue taken up in the minimum amount of petroleum ether and the solution allowed to stand in the refrigerator. The precipitate formed is filtered off to yield another crop of the above oxime. The filtrate is evaporated in vacuo, to yield the 2-hydroxy-2-(4a,10a-cis-1,2,3,4,4a,9,10,10a-octahydro-7-phenanthryl)-propane.

The mixture of 10 g. thereof and 50 ml. acetic acid anhydride is refluxed for 2 hours and evaporated in vacuo. The residue is taken up in diethyl ether, the solution washed with aqueous sodium bicarbonate, dried, evaporated, the residue distilled and the fraction boiling at 170–175°/0.3 mm. Hg collected to yield the 2-(4,a10a-cis-1,2,3,4,4a,9,10,10a-octahydro-7-phenanthryl)-propene.

Through the solution of 3 g. thereof in the minimum amount of cyclohexane containing 50 mg. benzoyl peroxide, a fine stream of gaseous hydrogen bromide is bubbled for 1 hour and the mixture allowed to stand at room temperature overnight. It is diluted with cyclohexane, washed with water and aqueous sodium bicarbonate, dried, filtered and evaporated, to yield the 2-(4a,10a-cis-1,2,3,4,4a,9,10,10a-octahydro-7-phenanthryl)-propyl bromide.

The mixture of 5 g. thereof, 5 g. potassium hydroxide, 20 ml. water and 80 ml. ethyleneglycol is refluxed for 5 hours, cooled and diluted with 100 ml. water. It is extracted with diethyl ether, the extract washed with water, dried and evaporated, to yield the 2-(4a,10a-cis-1,2,3,4,4a,9,10-10a - octahydro-7-phenanthryl)-propanol showing in the I.R. spectrum bands at 3300, 720 and 755 cm.$^{-1}$ and melting at 68–70°.

EXAMPLE 17

To the gray mixture of 3.32 g. sodium, a few crystals ferric nitrate nonahydrate and 500 ml. anhydrous ammonia, the solution of 32.7 g. ethyl 4a,10a-cis-1,2,3,4,4a,9,10,10a-octahydro-7-phenanthryl acetate in 50 ml. diethyl ether is added while stirring, and stirring is continued for 20 minutes. Hereupon the solution of 20.4 g. methyl iodide in 50 ml. diethyl ether is added during 8 minutes and the mixture stirred for 3 hours. It is combined with 7.7 g. ammonium chloride and 216 ml. diethyl ether and the ammonia allowed to evaporate at a warm water bath. The concentrate obtained is cooled in an ice bath, combined with 216 ml. 2 N hydrochloric acid, the aqueous phase washed with diethyl ether, the combined organic solutions washed with aqueous sodium bicarbonate and brine, dried, filtered and evaporated in vacuo, to yield ethyl α-(4a,10a-cis-1,2,3,4,4a,9,10,10a-octahydro-7-phenanthryl)-propionate as a viscous oil.

The mixture of 27.1 g. thereof, 420 ml. methanol and 17.7 g. potassium hydroxide is refluxed for 3 hours and evaporated in vacuo. The residue is taken up in water, the solution washed with hexane, cooled and acidified with concentrated hydrochloric acid. The mixture is extracted with diethyl ether, the extract washed with water and brine, dried, filtered and evaporated in vacuo. The residue is taken up in 150 ml. hot hexane, the solution concentrated and the precipitate formed recrystallized another time from hexane and aqueous isopropanol, to yield the α - (4a,10a-cis-1,2,3,4,4a,9,10,10a-octahydro-7-phenanthryl)-propionic acid melting at 137–142°; it is identical with the compounds obtained according to Examples 2 and 3.

The combined hexane mother liquors are evaporated in vacuo, the residue triturated with the isopropanolic mother liquor and diluted with petroleum ether. The precipitate formed is filtered off, to yield the low melting racemate of said compound melting at 104–110°. It can be processed as described in Example 13, to yield more of the above high melting racemate. The ethyl ester used as starting material can also be prepared as shown for the methyl ester described in said example.

Example 18

The mixture of 10 g. 4a,10a,-cis-7-chloromethyl-1,2,3,4,4a,9,10,10a - octahydro-phenanthrene, 30 ml. dimethylformamide and 2.5 g. sodium cyanide is stirred at room temperature for 1 hour, at 65° for 8 hours. It is diluted with 200 ml. water, saturated with sodium chloride and extracted with diethyl ether. The extract is dried, filtered, evaporated, the residue distilled and the fraction boiling at 155–160°/0.1 mm. Hg collected, to yield the 4a,10a-cis - 1,2,3,4,4a,9,10,10a-octahydro-7-phenanthryl-acetonitrile of the formula

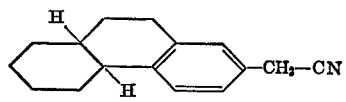

showing in the I.R. spectrum a strong band at 2240 cm.$^{-1}$.

The starting material is prepared as follows: The mixture of 30 g. 4a,10a - cis-1,2,3,4,4a,9,10,10a-octahydro-phenanthrene-7-carboxylic acid (Example 3) and 200 ml.

4 N methanolic hydrogen chloride is refluxed overnight and evaporated in vacuo. The residue is taken up in ice water, the mixture extracted with diethyl ether, the extract washed with aqueous sodium bicarbonate, dried, filtered and evaporated, to yield the corresponding methyl ester.

To the solution of 31 g. thereof in 100 ml. benzene, 100 ml. of a 70% solution of sodium methoxy-ethoxy-aluminum hydride in benzene is added dropwise while stirring and the mixture refluxed for 1 hour. After cooling, 35 ml. water are added, the precipitate formed filtered through infusorial earth and the filtrate concentrated in vacuo. The concentrate is diluted with water, extracted with methylene chloride, dried, filtered and evaporated. The residue is distilled and the fraction boiling at 150°/0.4 mm. Hg collected, to yield the 4a,10a-cis - 7 - hydroxymethyl - 1,2,3,4,4a,9,10,10a - octahydrophenanthrene.

The mixture of 10 g. thereof, 10 g. thionyl chloride and 50 ml. benzene is refluxed for 3 hours and evaporated in vacuo. The residue is taken up in benzene, the mixture again evaporated and the residue taken up in diethyl ether. The solution is washed with water and aqueous sodium bicarbonate, dried, filtered and evaporated, to yield the 4a,10a-cis-7-chloromethyl-1,2,3,4,4a, 9,10,10a-octahydrophenanthrene.

Example 19

The mixture of 6 g. 4a,10a-cis-1,2,3,4,4a,9,10,10a-octahydro-7-phenanthryl-acetonitrile, 10 ml. glacial acetic acid, 10 ml. water and 10 ml. concentrated sulfuric acid is refluxed for 2 hours, cooled and poured over ice. The mixture is extracted with diethyl ether, the extract washed with 4% aqueous sodium hydroxide and the basic washings acidified with concentrated hydrochloric acid. The mixture is extracted with diethyl ether, the extract washed with brine, dried, filtered and evaporated in vacuo. The residue is converted into the cyclohexyl-ammonium salt and, from the latter, the 4a,10a-cis-1,2,3,4,4a,9,10,10a-octahydro-7-phenanthryl-acetic acid is liberated, melting at 74–76°. It is identical with the compound obtained according to Example 15.

Example 20

According to the methods described in the previous examples, advantageously according to Examples 3–6, the α - (1,2,3,4,9,10-hexahydro-7-phenanthryl)-propionic acid of the formula

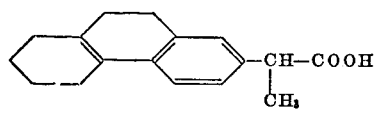

is prepared.

The starting material can be prepared as previously described, e.g. in Examples 3–6 or 11. The required precursor, i.e. the 7-chloro-1,2,3,4,9,10-hexahydrophenanthrene, can be prepared either by ring-closure of 2-[2-(3-chlorophenyl)-ethyl]-cyclohexanone, in the presence of a Lewis acid, e.g. boron fluoride or aluminum chloride, or by retropinacol rearrangement of 1-hydroxy-6-chloro - 1,2,3,4 - tetrahydronaphthalene-2-spirocyclopentane.

What is claimed is:

1. A compound having the formula

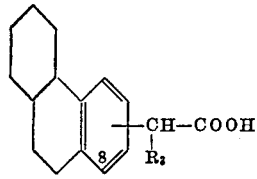

in which the acidic moiety is in one of the 6-, 7- or 8-positions and $R_3$ is hydrogen or lower alkyl, the 4a,10a-dehydro derivative thereof, or a lower alkyl ester, the ammonium or an alkali metal salt thereof.

2. A compound as claimed in claim 1, in which formula $R_3$ is hydrogen or methyl, the 4a,10a-cis-isomer or the 4a,10a-dehydro derivative thereof, or a lower alkyl ester, the ammonium, sodium or potassium salt thereof.

3. A compound as claimed in claim 1, and being the α-(4a,10a-cis-1,2,3,4,4a,9,10,10a - octahydro - 7 - phenanthryl)-propionic acid, a lower alkyl ester, the ammonium, sodium or potassium salt thereof.

4. A compound as claimed in claim 1, and being the α - (4a,10a - cis - 1,2,3,4,4a,9,10,10a - octahydro-6-phenanthryl)-propionic acid, a lower alkyl ester, the ammonium or potassium salt thereof.

5. A compound as claimed in claim 1, and being the α - (4a,10a - cis - 1,2,3,4,4a,9,10,10a - octahydro-8-phenanthryl)-propionic acid, a lower alkyl ester, the ammonium, sodium or potassium salt thereof.

6. A compound as claimed in claim 1, and being the α-(4a,10a-cis-1,2,3,4,4a,9,10,10a - octahydro - 7 - phenanthryl)-acetic acid, a lower alkyl ester, the ammonium, sodium or potassium salt thereof.

7. A compound as claimed in claim 1, and being the α - (1,2,3,4,9,10 - hexahydro - 7 - phenanthryl)-propionic acid, a lower alkyl ester, the ammonium, sodium or potassium salt thereof.

References Cited

Davidson et al.: Tet Letters, 1089 (1942).
Braun et al.: Chem. Ber. 57, 191 (1924).
Burger et al.: J.A.C.S. 59, 1302 (1937).

LORRAINE A. WEINBERGER, Primary Examiner
R. GERSTL, Assistant Examiner

U.S. Cl. X.R.

260—247.1, 343.3, 415 R, 469, 488 CD, 514 S, 515 A, 515 R, 554, 558 R, 566 A, 590, 592, 617 S, 618 D, 649 R, 650 R, 668 F